United States Patent [19]

Sturges

[11] Patent Number: 4,555,910
[45] Date of Patent: Dec. 3, 1985

[54] COOLANT/REFRIGERANT TEMPERATURE CONTROL SYSTEM

[75] Inventor: Fred D. Sturges, Rockford, Ill.

[73] Assignee: Borg-Warner Corporation, Chicago, Ill.

[21] Appl. No.: 573,189

[22] Filed: Jan. 23, 1984

[51] Int. Cl.$^4$ .............................................. F01P 7/02
[52] U.S. Cl. ........................................ 62/184; 236/35
[58] Field of Search ..................... 62/184, 183, 186; 236/35-35.3; 123/41.12, 41.49

[56] References Cited

U.S. PATENT DOCUMENTS

| | | | |
|---|---|---|---|
| 4,133,185 | 1/1979 | Dickey | 236/35.3 |
| 4,223,646 | 9/1980 | Kinder | 236/35 X |
| 4,228,880 | 10/1980 | Gee | 192/58 B |
| 4,425,766 | 1/1984 | Claypole | 236/35 X |

Primary Examiner—William E. Wayner
Attorney, Agent, or Firm—James E. Tracy

[57] ABSTRACT

A variable speed fan drive, operated in response to the sensed coolant temperature in an internal combustion engine for a vehicle, blows a controlled amount of air through the engine's radiator to maintain the coolant temperature in a desired narrow operating range. The air pulled in by the fan also cools the refrigerant flowing through the condenser of the vehicle's air conditioning system, the condenser being positioned in front of the coolant radiator. If insufficient condenser cooling occurs, even though the coolant may be adequately cooled, the refrigerant temperature rises and causes the compressor discharge pressure in the air conditioning system to increase. That pressure is monitored or sensed and if it exceeds a predetermined maximum allowable level the normal operation of the control system is overriden and the fan is driven at its maximum speed to maximize the air blown through the condenser and radiator, thereby decreasing the refrigerant temperature and thus the discharge pressure.

6 Claims, 1 Drawing Figure

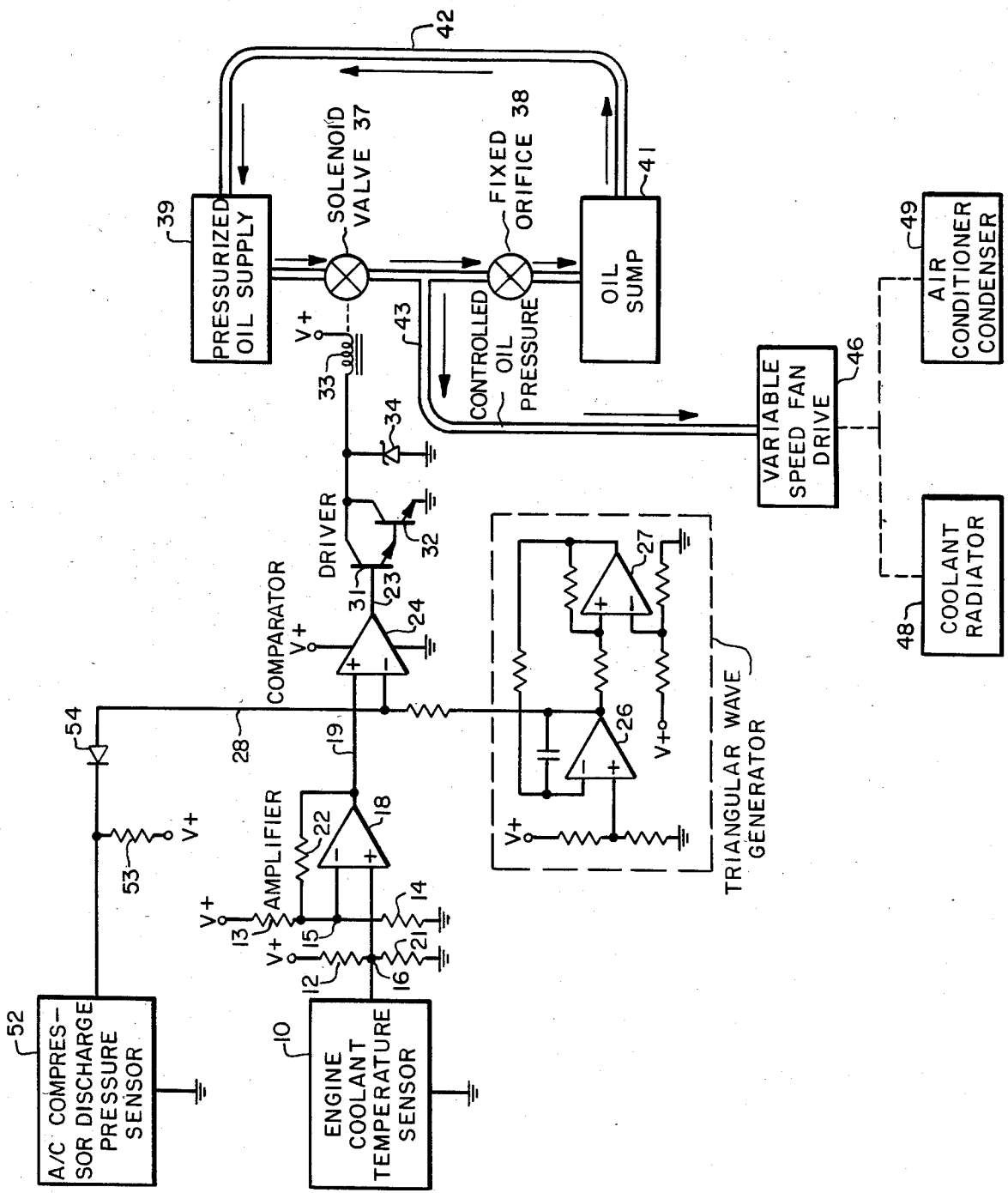

COOLANT/REFRIGERANT TEMPERATURE CONTROL SYSTEM

BACKGROUND OF THE INVENTION

This invention relates to a temperature control system for the coolant in an internal combustion engine for a vehicle and also for the refrigerant in the vehicle's air conditioning system.

In many internal combustion engines, particularly those used in trucks, the speed of the cooling fan is modulated or varied in response to the coolant temperature, delivering to the coolant radiator only the amount of air that is needed to maintain the engine operating temperature at the desired level to achieve optimum performance. Compared to the more conventional constant speed fan drive, the variable speed fan drive requires substantially less horsepower thereby reducing fuel consumption, and has a much lower noise level.

If the truck has an air conditioning system the condenser for the system will usually be located in front of the coolant radiator, the air blown through the radiator by the variable speed fan also cooling the refrigerant flowing through the condenser. Normally the blown air will be sufficient to provide the required cooling of the refrigerant, but if this does not occur the refrigerant temperature will rise, causing the pressure of the refrigerant at the discharge outlet of the system's compressor to increase. This could happen if the fan speed is relatively low or if the fan drive is completely de-energized, which will usually be the case when the coolant temperature is relatively low. For example, when a diesel engine truck is parked and its engine is idling the coolant temperature may be below the optimum operating temperature, as a result of which the cooling fan will be turned off. If the rising compressor discharge pressure, caused by the inadequate cooling of the condenser, is not stopped at a preset maximum level, the safety cut off, usually installed in a compressor, will actuate and the air conditioning system will be shut down. Hence, it is essential to provide a safety device which will operate before that maximum level is exceeded in order to turn the fan full on to maximize the air pulled in through the condenser, thereby dropping the refrigerant temperature and therefore the discharge pressure. In this way, the air conditioning system will continue to operate.

The present invention achieves, by means of a unique and relatively simple and inexpensive control system, temperature control of both the coolant flowing through a coolant radiator and the refrigerant flowing through a condenser, the refrigerant temperature being so controlled that the refrigerant discharge pressure never exceeds a preset maximum allowable limit.

SUMMARY OF THE INVENTION

The invention provides a coolant/refrigerant temperature control system for controlling the temperature of coolant flowing through the coolant radiator of an internal combustion engine in a vehicle and for also controlling the temperature of refrigerant flowing through the condenser of an air conditioning system for the vehicle thereby to control the refrigerant discharge pressure, the condenser being mounted in front of the radiator. The temperature control system comprises temperature sensing means for sensing the coolant temperature and producing a temperature signal having an amplitude proportional to the sensed coolant temperature. A pulse width modulation circuit is provided for developing, in response to the temperature signal, a pulse width modulated signal having a duty cycle which is proportional to the sensed coolant temperature. There are means responsive to the pulse width modulated signal for producing a controlled fluid pressure which is a function of and represents the sensed coolant temperature. A variable speed fan drive, which is controlled by the fluid pressure, normally blows a controlled amount of air through the condenser, to dissipate heat absorbed by the refrigerant, and then through the radiator, to dissipate heat absorbed by the coolant, as determined by the sensed coolant temperature. Pressure sensing means are provided for sensing the compressor discharge pressure of the refrigerant in the air conditioning system, the discharge pressure being directly proportional to the refrigerant temperature in the condenser. Finally, the temperature control system includes an override circuit, which responds to the pressure sensing means when the sensed discharge pressure exceeds a predetermined maximum allowable level, for overriding the operation of the pulse width modulation circuit to change the fluid pressure as necessary to maximize the fan speed and thus the air pulled in through the condenser and radiator, thereby reducing the refrigerant temperature in the condenser and consequently the refrigerant discharge pressure.

DESCRIPTION OF THE DRAWING

The features of the invention which are believed to be novel are set forth with particularity in the appended claims. The invention may best be understood, however, by reference to the following description in conjunction with the accompanying drawing which schematically illustrates a temperature control system, constructed in accordance with the invention, for the coolant in an internal combustion engine of a vehicle and for the refrigerant in an air conditioning system for the vehicle.

DESCRIPTION OF THE ILLUSTRATED EMBODIMENT

It will be assumed that the temperature control system shown in the drawing is employed in a truck having an internal combustion engine and an air conditioning system, but it will be apparent that the invention can be used with any air conditioned vehicle. It will also be assumed that the internal combustion engine is cooled in conventional manner by circulating coolant around the engine jacket. A thermostat or flow control valve, usually installed on top of the engine block, controls the flow of coolant from the engine jacket to the coolant radiator after the engine is started and as the engine warms up. As the engine temperature, and consequently the coolant temperature, rise during the warm-up period, a larger and larger amount of coolant will be diverted by the thermostat from the engine jacket to the radiator to dissipate the engine heat. When the thermostat becomes fully open, all of the coolant is circulated through the radiator. The amount of ram air impinging on the radiator to effect cooling of the coolant circulating through the radiator and engine block may be sufficient to stabilize the engine temperature at the desired level. Ram air is the effective air that, due to the truck's velocity, strikes the radiator.

If insufficient heat dissipation occurs in the radiator, however, and the coolant temperature continues to increase, a variable speed fan drive will then be regulated, by the disclosed temperature control system in a manner to be explained, to pull outside air in through the radiator to effect cooling of the coolant, the amount of air blown through the radiator, and hence the amount of heat dissipation, being directly proportional to the fan speed. The condenser for the truck's air conditioner will be mounted in front of the coolant radiator so the air drawn in by the fan will also cool the refrigerant flowing through the condenser to effectively dissipate the heat absorbed by the refrigerant in the evaporation phase of the refrigeration cycle. The truck may also be equipped with controllable radiator shutters which are like venetian blinds and would be positioned in front of the condenser. The shutters would be opened in response to the engine temperature, after the thermostat is fully opened but before the fan is turned on. Depending on engine load or external conditions, the ram air flowing through the shutters may be sufficient to provide the required cooling and it may not be necessary to energize the fan.

Turning now to the drawing, temperature sensor 10 senses the coolant temperature and preferably is located at a convenient point in the coolant flow path where the coolant will be the hottest. For example, the sensor may be positioned at the top of the engine block to sense the temperature of the coolant in the engine jacket. Sensor 10 comprises a thermistor having a positive temperature coefficient so that its resistance is directly proportional to the coolant temperature. Resistors 12, 13 and 14 in conjunction with the resistance of sensor 10 form a bridge circuit. As the sensed coolant temperature changes, the voltage across circuit junctions or points 15 and 16 varies proportionally. Since sensor 10 has a positive temperature coefficient, when the coolant temperature increases, for example, the resistance of the sensor increases and the voltage at junction 16 increases relative to the fixed voltage at junction 15. Amplifier 18 amplifies the voltage difference between junctions 15 and 16 to produce on conductor 19 a voltage signal, which may be called a "temperature signal", having an amplitude directly proportional to the sensed coolant temperature. Resistors 21 and 22 control the amount of amplification.

In response to the temperature signal, a driving signal is developed on line 23 having a characteristic which is a function of the sensed coolant temperature. More specifically, a pulse width modulation circuit 24, 26, 27 is provided to produce on line 23 a pulse width modulated signal having a waveshape determined by the temperature signal on line 19. To explain, a pulse width modulated signal is rectangular shaped, containing periodically recurring positive-going pulse components with intervening negative-going pulse components. The frequency will be constant but the relative widths of the positive and negative pulse components will vary depending on the amplitude of the temperature signal. As the width or duration of each positive pulse component increases, each negative pulse component decreases proportionately, and vice versa. In other words, since the period or time duration of a complete cycle is constant, when the duration of a positive pulse component changes in one sense or direction the width of the immediately succeeding negative pulse component must change in the opposite sense. The pulse width modulated signal has a duty cycle characteristic which is the ratio of the width of each positive-going pulse compared to the duration of a complete cycle.

In the pulse width modulation circuit, amplifiers 26 and 27, and their associated circuit elements, form a well-known triangular wave generator or oscillator for supplying a triangular shaped voltage signal to the negative or inverting input of comparator 24, the positive or non-inverting input of which receives the temperature signal over line 19. Preferably, the frequency of the triangular shaped signal is around 10 hertz. Ignoring for now the effect of the circuit connected over line 28 to the negative input of comparator 24, the voltage at that negative input will vary alternately above and below the voltage level of the temperature voltage signal at the positive input. Each time the alternating voltage at the negative input drops below the temperature voltage at the positive input, the output voltage of comparator 24 abruptly switches from ground or zero volts to V+, such as +12 volts d-c, where it remains until the triangular shaped voltage signal at the negative input becomes greater than the temperature voltage signal at the positive input. At that instant, the output voltage of the comparator switches from its high level (V+) back to its low level or zero. The greater the amplitude of the temperature signal, the greater the time intervals during which the output of comparator 24 is established at its high potential level and the smaller the time intervals when the output is at zero potential. In this way, the output of comparator 24 provides a pulse width modulated, rectangular shaped signal, the relative widths of the alternating positive-going and negative-going pulses being modulated under the control of the temperature signal on line 19. The duty cycle of the pulse width modulated signal is the ratio of the time interval of one positive pulse component compared to a complete cycle, namely the total time duration of one positive pulse component and one negative pulse component. Hence, the duty cycle of the pulse width modulated signal on line 23 will be directly proportional to the sensed coolant temperature.

The pulse width modulated signal, or driving signal, operates the driver, comprising transistors 31 and 32, to effectively apply that signal to solenoid coil 33. The V+ operating potential at the right terminal of coil 33 may also be +12 volts. During each positive-going pulse when the output of comparator 24 is established at its high level, transistors 31 and 32 conduct and the left terminal of coil 33 will be essentially grounded, thereby applying a full 12 volts d-c across the coil. During the intervening negative-going pulses, when the output of comparator 24 is zero, transistors 31 and 32 will be turned off and coil 33 will be de-energized. Hence, coil 33 is alternately energized and de-energized, namely cycled on and off, and its duty cycle is the same as, and is determined by, the duty cycle of the pulse width modulated signal. Zener diode 34 protects transistors 31 and 32 against inductive voltage spikes generated by coil 33 turning off.

Solenoid off-on valve 37 is controlled by solenoid coil 33, and since it is turned on and off at a relatively fast rate, the valve effectively provides a variable orifice or opening the size of which is determined by the energization of coil 33. Each time coil 33 is energized valve 37 is opened, and when the coil is de-energized the valve is closed. Thus, the greater the energization of coil 33, namely the greater the duty cycle, the less restriction introduced by valve 37 and the greater the effective opening or orifice.

Solenoid valve 37 is interposed in series with an oil circuit, the oil flowing from a pressurized oil supply 39 through valve 37 and then through a fixed orifice 38 to an oil sump 41, from which the oil is returned over oil line 42 to the pressurized oil supply 39 which would include an oil pump. Of course, in an internal combustion engine, especially a truck engine, many sources of oil pressure are readily available. The engine oil pressure may be used, or pressurized oil may be obtained from the transmission supply. Moreover, and as will be made apparent, oil pressure is not essential. Any source of pressurized fluid will suffice. For example, air pressure from air compressors, usually included in trucks, may be employed.

With the illustrated oil circuit, the oil pressure in oil line 43, which connects to the junction between valve 37 and fixed orifice 38, will constitute a controlled fluid (oil) pressure which is a function of and represents the sensed coolant temperature. Specifically, the controlled oil pressure in line 43 is directly proportional to the sensed temperature. To explain further, if the coolant temperature is relatively low the duty cycle of solenoid valve 37 will likewise be relatively low and the effective opening of valve 37 will be relatively small. As a result, the restricton to the flow of oil through valve 37 will be relatively high causing the pressure drop across the valve to be relatively high, with most of the oil pressure drop from pressurized oil supply 39 to oil sump 41 being dropped across valve 37, rather than across fixed orifice 38. As the coolant temperature increases the duty cycle of coil 33 increases and the effective opening of valve 37 becomes larger, thereby introducing less restricton to the oil flow and less pressure drop. Consequently, as the coolant temperature rises the pressure drop decreases across valve 37 and increases across fixed orifice 38, causing the oil pressure in oil line 43 to increase toward the oil supply pressure as the coolant temperature increases.

The controlled oil pressure in oil line 43 governs the operation of variable speed fan drive 46 to control the temperature of the coolant in the radiator 48 of the internal combustion engine. At very low coolant temperatures, such as when the engine is started or in extremely cold weather, the controlled oil pressure will be so low that fan drive 46 will remain de-energized. At this time the thermostat for the cooling system will be in its fully closed position so that the coolant will be circulated by the coolant or water pump only around the engine jacket. Radiator shutters, if used, would also be fully closed so no ram air would impinge the radiator. As the engine temperature and the coolant temperature increase, the thermostat opens in proportion to the temperature rise, allowing the coolant trapped in the engine jacket to flow through the radiator to dissipate the heat absorbed from the engine by the coolant. Although the controlled oil pressure in line 43 will also be increasing from a low level during the engine warm-up period, fan drive 46 will be unaffected since it is constructed so that it will not operate in response to that low oil pressure.

When the coolant temperature increases to the extent that the thermostat fully opens, all of the coolant will be circulated through the radiator to be cooled down. If at that time insufficient cooling occurs in the radiator, causing the engine temperature to continue rising, radiator shutters, if used, would begin to open, allowing more and more ram air to strike the radiator to dissipate heat absorbed by the coolant. Of course, if radiator shutters are not employed ram air is available as soon as the coolant begins flowing through the radiator. The ram air also impinges on the condenser 49, of the truck's air conditioning system, which is located in front of coolant radiator 48. Depending on the vehicle's speed and ambient air temperature, the coolant may be cooled sufficiently to stabilize the engine temperature at the desired level required for optimum engine performance. Moreover, the ram air may also be adequate to remove the amount of heat from the refrigerant required for proper operation of the air conditioner.

Assume now that external or load conditions prevent adequate cooling, even with the thermostat and the radiator shutters fully open, and the coolant becomes hotter than desired. At this coolant temperature the controlled oil pressure in line 43 will be sufficient to cause fan drive 46 to start rotating the fan to draw air through radiator 48 to effect additional cooling of the coolant. If the coolant temperature still keeps rising, the increasing oil pressure causes the fan drive 46 to gradually increase the fan speed until the cooling effect on the coolant is sufficient to stabilize its temperature, and consequently the engine temperature, within the desired limits for optimum engine performance.

In the event that the cooling imparted to the refrigerant in condenser 49 is less than that needed for proper operation of the air conditioning system, the refrigerant temperature rises and this causes the compressor discharge pressure to increase. Unless that pressure is checked or limited, the cutoff on the compressor will operate to turn the compressor, and thus the air conditioning system, off. In accordance with a feature of the invention regardless of the operational status of any of the coolant temperature control devices, namely the thermostat, the radiator shutters and the fan drive, if the condensing temperature and discharge pressure reach undesired levels the fan is automatically and immediately driven at its maximum speed to maximize the air flow through the condenser to lower the refrigerant temperature and pressure. This is accomplished by means of an override circuit which functions when the discharge pressure is too high and causes the controlled oil pressure to increase to the level necessary to run the fan at its top speed.

More particularly, an air conditioner compressor discharge pressure sensor 52 senses the pressure of the refrigerant at the discharge outlet of the compressor and produces an override signal, for application over line 28 to the negative input of comparator 24, when the sensed discharge pressure exceeds a predetermined maximum allowable level. Preferably, sensor 52 is merely a pressure-actuated off-on switch. When the discharge pressure is normal, the switch is open and the positive d-c voltage applied, via resistor 53, to the cathode of diode 54 maintains the diode cutoff. However, when the maximum allowable discharge pressure is exceeded the switch in sensor 52 closes and grounds the cathode of diode 54. The diode thereupon conducts and establishes line 28 and the negative input of comparator 24 at ground or zero potential. With the negative input now being held at a voltage less than that on the positive input, the comparator's output will be maintained at its high level to cause continuous energization of coil 33. This maximizes the oil pressure in line 43 to drive the fan at its maximum speed. In short, the override circuit 28, 53, 54, in response to the pressure sensing means 52 when the sensed discharge pressure exceeds the maximum allowable level, overrides the operation of the pulse width modulation circuit 24, 26, 27 to change the oil pressure as necessary to maximize the fan speed and thus the air drawn in through the condenser and radiator, thereby reducing the refrigerant temperature in the condenser and consequently the refrigerant discharge pressure.

The invention thus provides a relatively simple and inexpensive, and yet fast acting, coolant/refrigerant temperature control system for a vehicle, the system featuring a unique override control for ensuring that the refrigerant discharge pressure never exceeds a preset limit.

The temperature control system disclosed in the drawing may be modified to provide a controlled oil pressure which is inversely proportional to the sensed temperature of the coolant. This is accomplished merely by reversing the order of solenoid valve 37 and fixed orifice 38 in the oil circuit. At low coolant temperatures valve 37 would introduce a high flow restriction and most of the pressure drop would be across that valve, the oil pressure at the junction of orifice 38 and valve 37 thereby being high. Conversely, at high coolant temperatures valve 37 would present a low flow restriction and most of the pressure drop would be across orifice 38. Of course, the pressure actuated, variable speed fan drive 46 would have to be of the type that operates in a reverse manner as previously explained in connection with the illustrated embodiment. In other words, at low temperatures when the controlled oil pressure begins to drop from its maximum level as the coolant heats up, fan drive 46 would be inoperative. If the coolant temperature continues to increase into the temperature range, over which the fan drive controls the coolant, the oil pressure continues to drop and causes the fan speed to gradually increase until the necessary amount of air is pulled through the radiator to properly cool the coolant. An advantage of this variation of the invention is that since the lower the oil pressure the greater the cooling imparted to the coolant and to the refrigerant, if there is a failure in the oil supply or valve opening maximum cooling will occur. The fan will be driven by fan drive 46 at its maximum speed. This is a safety feature to prevent engine overheating and compressor damage in the event of a breakdown in the source of pressurized fluid or valve operation.

While particular embodiments of the invention have been described, modifications may be made, and it is intended in the appended claims to cover all such modifications as may fall within the true spirit and scope of the invention.

What is claimed is:

1. A coolant/refrigerant temperature control system for controlling the temperature of coolant flowing through the coolant radiator of an internal combustion engine in a vehicle and for also controlling the temperature of refrigerant flowing through the condenser of an air conditioning system for the vehicle thereby to control the refrigerant discharge pressure, the condenser being mounted in front of the radiator, said temperature control system comprising:

temperature sensing means for sensing the coolant temperature and producing a temperature signal having an amplitude proportional to the sensed coolant temperature;

a pulse width modulation circuit for developing, in response to said temperature signal, a pulse width modulated signal having a duty cycle which is proportional to the sensed coolant temperature;

means responsive to said pulse width modulated signal for producing a controlled fluid pressure which is a function of and represents the sensed coolant temperature;

a variable speed fan drive, controlled by the fluid pressure, for normally blowing a controlled amount of air through the condenser, to dissipate heat absorbed by the refrigerant, and then through the radiator, to dissipate heat absorbed by the coolant, as determined by the sensed coolant temperature;

pressure sensing means for sensing the compressor discharge pressure of the refrigerant in the air conditioning system, which discharge pressure is directly proportional to the refrigerant temperature in the condenser;

and an override circuit, responsive to said pressure sensing means when the sensed discharge pressure exceeds a predetermined maximum allowable level, for overriding the operation of the pulse width modulation circuit to change the fluid pressure as necessary to maximize the fan speed and thus the air pulled in through the condenser and radiator, thereby reducing the refrigerant temperature in the condenser and consequently the refrigerant discharge pressure.

2. A coolant/refrigerant temperature control system according to claim 1 wherein the controlled fluid pressure is normally directly proportional to the sensed coolant temperature, but is established at its maximum level to maximize the fan speed when the sensed discharge pressure rises above the predetermined maximum allowable level.

3. A coolant/refrigerant temperature control system according to claim 1 wherein the controlled fluid pressure is produced by supplying pressurized fluid to a solenoid off-on valve operated by the pulse width modulated signal, the effective opening of the solenoid valve and the pressure drop thereacross being proportional to the duty cycle of the pulse width modulated signal.

4. A coolant/refrigerant temperature control system according to claim 1 wherein said pressure sensing means is a pressure-actuated off-on switch which applies an override signal over said override circuit to said pulse width modulation circuit when the sensed discharge pressure is above the predetermined maximum allowable level.

5. A coolant/refrigerant temperature control system according to claim 1 wherein said pulse width modulation circuit includes a triangular wave generator and a comparator, the temperature signal and a triangular shaped signal, developed by said triangular wave generator, being applied to said comparator to produce said pulse width modulated signal at the comparator's output.

6. A coolant/refrigerant temperature control system according to claim 5 wherein said override circuit applies an override signal to an input of said comparator, when the sensed refrigerant discharge pressure exceeds the predetermined maximum allowable level, to establish and maintain the comparator's output at a fixed signal level which causes the fluid pressure to maximize the fan speed.

* * * * *